(12) United States Patent
Lytle (10) Patent No.: US 10,676,189 B1
(45) Date of Patent: Jun. 9, 2020

(54) AIRCRAFT CAPTURE SYSTEM AND METHOD

(71) Applicant: LOCKHEED MARTIN CORPORATION, Bethesda, MD (US)

(72) Inventor: William Benton Lytle, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 504 days.

(21) Appl. No.: 15/422,385

(22) Filed: Feb. 1, 2017

(51) Int. Cl.
    *B64D 5/00* (2006.01)
    *B64D 3/00* (2006.01)
    *B64C 39/02* (2006.01)

(52) U.S. Cl.
    CPC .......... *B64C 39/024* (2013.01); *B64C 39/022* (2013.01); *B64C 2201/182* (2013.01); *B64D 3/00* (2013.01); *B64D 5/00* (2013.01)

(58) Field of Classification Search
    CPC .... B64C 2201/182; B64D 39/06; B64D 3/00; B64D 5/00
    See application file for complete search history.

(56) References Cited

U.S. PATENT DOCUMENTS

| | | | | |
|---|---|---|---|---|
| 4,431,333 A * | 2/1984 | Chandler | ............ | B64G 1/641 244/172.4 |
| 2004/0050998 A1* | 3/2004 | Edwards | ............ | B64D 39/06 244/10 |
| 2006/0065785 A1* | 3/2006 | Enig | ............ | B64D 39/04 244/135 A |
| 2010/0001124 A1* | 1/2010 | Feldmann | ............ | B64D 39/04 244/58 |
| 2012/0168564 A1* | 7/2012 | Feldmann | ............ | B64D 39/06 244/135 A |
| 2015/0344147 A1* | 12/2015 | Espinosa Sanchez | ............ | B64D 39/06 244/135 A |
| 2016/0090188 A1* | 3/2016 | Blancp | ............ | B64D 39/06 244/135 A |
| 2018/0065757 A1* | 3/2018 | Pruzan | ............ | B64D 39/06 |

* cited by examiner

*Primary Examiner* — Philip J Bonzell
*Assistant Examiner* — Tye William Abell
(74) *Attorney, Agent, or Firm* — Morgan, Lewis & Bockius LLP (57) ABSTRACT

An aircraft-to-aircraft retrieval system can be used to capture a remote aircraft for retrieval into and service by a transport aircraft during a flight mission. An aircraft capture device can be towed from the transport aircraft and brought into proximity with the remote aircraft during flight. A probe of the remote aircraft can be received within a receptacle of the aircraft capture device, and locking cables or locking arms of the aircraft capture device can be secured onto a portion of the probe. The aircraft capture device can be provided with an activation switch for detecting contact with the probe located in the receptacle and for transmitting an indication of the contact to initiate engagement of the probe. The aircraft capture device can be locked to the probe while it is reeled to the transport aircraft for retrieval of the remote aircraft.

6 Claims, 8 Drawing Sheets

AIRCRAFT CAPTURE SYSTEM AND METHOD

STATEMENT REGARDING FEDERALLY SPONSORED RESEARCH OR DEVELOPMENT

This invention was made with government support under GREMLINSLMSPACE01 awarded by the Defense Advanced Research Projects Agency. The Government has certain rights to this invention.

BACKGROUND

Field

The present disclosure generally relates to capture of aircraft and, in particular, aircraft-to-aircraft capturing techniques during a flight mission.

Description of the Related Art

Some aircraft, including unmanned aircraft and missiles, can be deployed for a flight mission. Upon completion of the flight mission, the aircraft must return to its source or otherwise be retrieved for service and further deployment at a later time.

SUMMARY

Mid-air retrieval of an aircraft can be performed by another aircraft during flight. The present disclosure describes an aircraft-to-aircraft retrieval system that can be used to capture a remote aircraft for retrieval into and service by a transport aircraft during a flight mission.

According to some embodiments of the present disclosure, an aircraft capture device can include: a receptacle; one or more locking arms wherein each of the one or more locking arms is rotatable about a corresponding axis from an unlocked configuration to a locked configuration within the receptacle; and an actuation mechanism comprising rollers attached to a plate, wherein each of the rollers is in contact with a corresponding locking arm, wherein rotation of the plate transitions the one or more locking arms between the unlocked configuration and the locked configuration.

Within the receptacle, an activation switch can be provided for detecting contact with a probe located in the receptacle and for transmitting an indication of the contact. A controller can be configured to operate a motor to rotate the plate upon receipt of the indication from the activation switch. A nose portion and a tail portion can be provided, with the motor residing within the nose portion, the tail portion comprising one or more batteries connected to the motor.

An engagement end of each locking arm can include a rotatable wheel. The actuation mechanism can include a brake for maintaining the one or more locking arms in the locked configuration. The one or more locking arms and the plate can be rotatable about parallel axes.

According to some embodiments of the present disclosure, a method of securing a probe of an aircraft within an aircraft capture device can include: receiving the probe within a receptacle of the aircraft capture device; and positioning engagement ends of one or more locking arms within a groove of the probe by rotating a plate attached to rollers, wherein each of the rollers applies a force to a corresponding locking arm to rotate the corresponding locking arm about a corresponding axis.

The positioning comprises applying the force to each of the one or more locking arms at a location between the engagement end and the corresponding axis. Contact with the probe can be detected by an activation switch located in the receptacle. An indication of the contact can be transmitted. Based on the indication, a motor can be operated to perform the positioning.

After the positioning, a brake of the plate can be set to maintain the engagement ends of the one or more locking arms within the groove of the probe. The one or more locking arms and the plate can be rotated about parallel axes.

According to some embodiments of the present disclosure, a aircraft capture device can include: a receptacle; a first ring having a first drive and a first locking solenoid for locking the first ring when not the first solenoid is not activated; a second ring having a second drive and a second locking solenoid for locking the second ring when the second solenoid is not activated, the second ring being rotatable relative to the first ring; and one or more locking cables, wherein each of the one or more locking cables is connected to both the first ring and the second ring, and at least a portion of each of the one or more locking cables extends within the receptacle between the first ring and the second ring.

Within the receptacle, an activation switch can be provided for detecting contact with a probe located in the receptacle and for transmitting an indication of the contact. A controller can be configured to operate the first drive and the second drive to rotate the first ring and the second ring upon receipt of the indication from the activation switch. The receptacle can have a cross-sectional shape that is geometrically similar to a cross-sectional shape of the probe.

According to some embodiments of the present disclosure, a method of securing a probe within an aircraft capture device can include: receiving the probe within a receptacle; positioning one or more locking cables within a groove of the probe by rotating a first ring of the aircraft capture device relative to a second ring of the aircraft capture device, wherein the one or more locking cables is connected to the first ring and the second ring so the rotating increases tension of the one or more locking cables; and securing the one or more locking cables by deactivating a first solenoid to lock the first ring and a second solenoid to lock the second ring.

The rotating can include: with an activation switch located in the receptacle, detecting contact with the probe and transmitting an indication of the contact; and based on the indication, operating a first drive and a second drive to perform the positioning. The positioning can include activating the first solenoid to unlock the first ring and activating the second solenoid to unlock the second ring.

In the following description, specific embodiments are described to shown by way of illustration how the invention may be practiced. It is to be understood that other embodiments may be utilized and changes may be made without departing from the scope of the present invention.

DETAILED DESCRIPTION

Mid-air retrieval of an aircraft can be performed by another aircraft during flight. In some existing systems, a target aircraft, such as an unmanned aircraft, is retrieved during its descent, such as while falling slowly by a parachute. However, these systems require the target aircraft to provide accommodations for the parachute, and the retrieving aircraft must maneuver to capture the target aircraft, which is moving at a different speed and in a different direction. Other systems require an aircraft to safely land to be retrieved. However, this approach requires a safe location to land and the performance of a landing procedure by the aircraft, which may be unmanned.

In the field of aerial refueling, a tanker aircraft is loaded with excess fuel, which is transferred to one or more receiving aircraft during flight to extend the flight time and range of the receiving aircraft. Refueling techniques generally avoid secure connections between the tanker aircraft and the receiving aircraft, to minimize the risk of damage if excessive forces occur between the aircraft. Instead, refueling techniques typically provide for ready release of the receiving aircraft.

The present disclosure describes an aircraft-to-aircraft retrieval system that can be used to capture a remote aircraft for retrieval into and service by a transport aircraft during a flight mission. Techniques of the present disclosure provide solutions that are less cumbersome, more efficient, and more repeatable than those requiring retrieval of an aircraft with a deployed parachute. Techniques described herein can be used for deployment and efficient retrieval of a swarm of remote aircraft within a single flight mission, thereby avoiding the need to independently manage safe landing of each remote aircraft.

Figure 1:
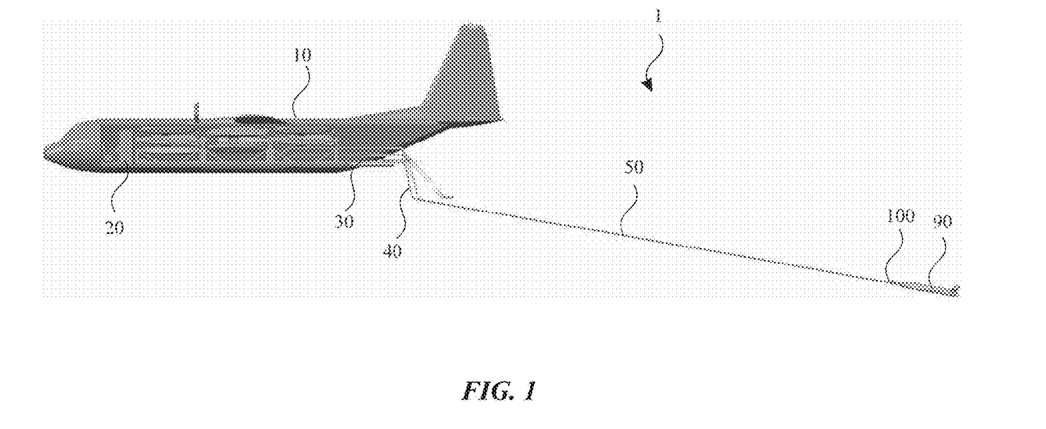
FIG. 1 illustrates a view of a capture system, according to some embodiments of the present disclosure.

According to some embodiments, an aircraft-to-aircraft system can be used to capture a remote aircraft for retrieval into and service by a transport aircraft. FIG. 1 illustrates a capture system 1, according to some embodiments of the present disclosure. According to some embodiments, for example as illustrated in FIG. 1, the capture system 1 can include a transport aircraft 10 from which mechanisms can be deployed to capture and retrieve a remote aircraft 90. The remote aircraft 90 can include, for example, unmanned aircraft, drone, remote-controlled aircraft, a missile (e.g., air-to-surface missile), and/or a manned aircraft. The remote aircraft 90 can include equipment for performing functions during a flight mission. For example, the remote aircraft 90 can include sensors, cameras, radar equipment, communication equipment, radar jamming equipment, and/or communication jamming equipment. The remote aircraft 90 can be deployed from the transport aircraft 10 and/or from another location. The remote aircraft 90 can be retrieved by the transport aircraft 10 and/or at another location.

Figure 2:
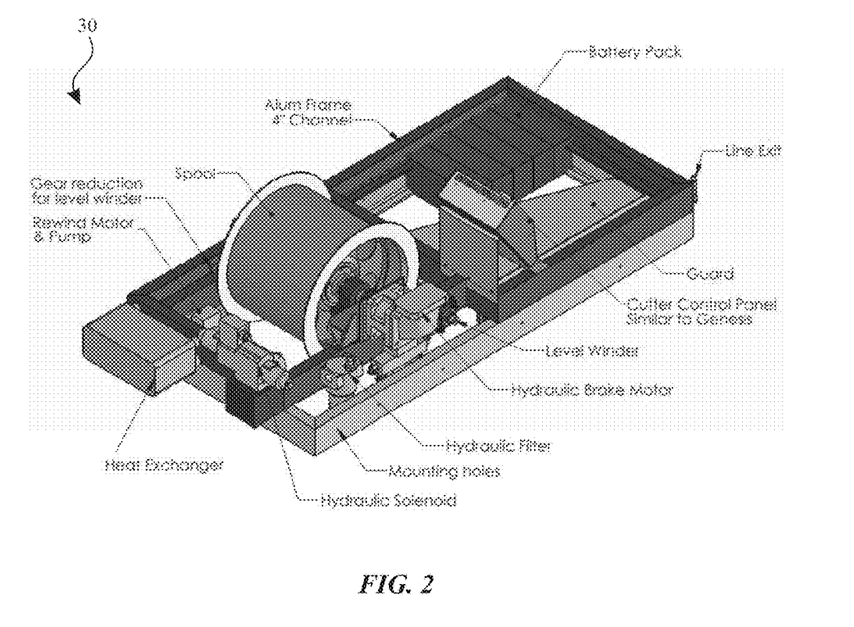
FIG. 2 illustrates a perspective view of a winch device, according to some embodiments of the present disclosure.

The transport aircraft 10 can include equipment for interacting with the remote aircraft 90 during flight. For example, the transport aircraft 10 can include a capture arm 40 that guides a tether 50 to a space outside the transport aircraft 10. At or within the transport aircraft 10, a winch device 30 can control the deployment and/or retraction of the tether 50. For example, the winch device 30 can facilitate towing of the tether 50 and maneuvering of an aircraft capture device 100 to the remote aircraft 90. The winch device 30 can further facilitates reeling of the aircraft capture device 100 and/or the remote aircraft 90 after capture of the remote aircraft 90 within the aircraft capture device 100. The winch device 30 and/or the capture arm 40 can control the length, direction, and positioning of the tether 50 and/or the aircraft capture device 100 during flight. At or within the transport aircraft 10, a transport controller 20 can be employed to operate the winch device 30, the capture arm 40, and/or the aircraft capture device 100. The transport controller 20 can include processing equipment, communication equipment, and/or a user interface to control aspects of the capture system 1. For example, the transport controller 20 can be used to communicate with the aircraft capture device 100 and control lift, side force, and/or roll of the aircraft capture device 100. By further example, the transport controller 20 can be used to communicate with the winch device 30 and control payouts and/or retraction of the tether 50. The tether can have a tension limit that allows the tether to be broken when forces between the remote aircraft 90 and the transport aircraft 10 exceed a threshold. Alternatively or in combination, the winch device 30 can provide a line cutter that allows the tether 50 to be manually or automatically cut when forces between the remote aircraft 90 and the transport aircraft 10 exceed a threshold.

Figure 3:
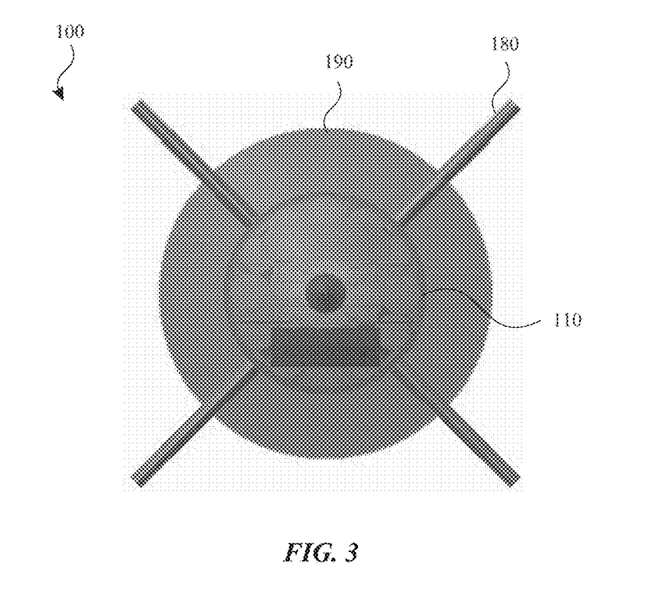
FIG. 3 illustrates a front view of an aircraft capture device, according to some embodiments of the present disclosure.
Figure 4:
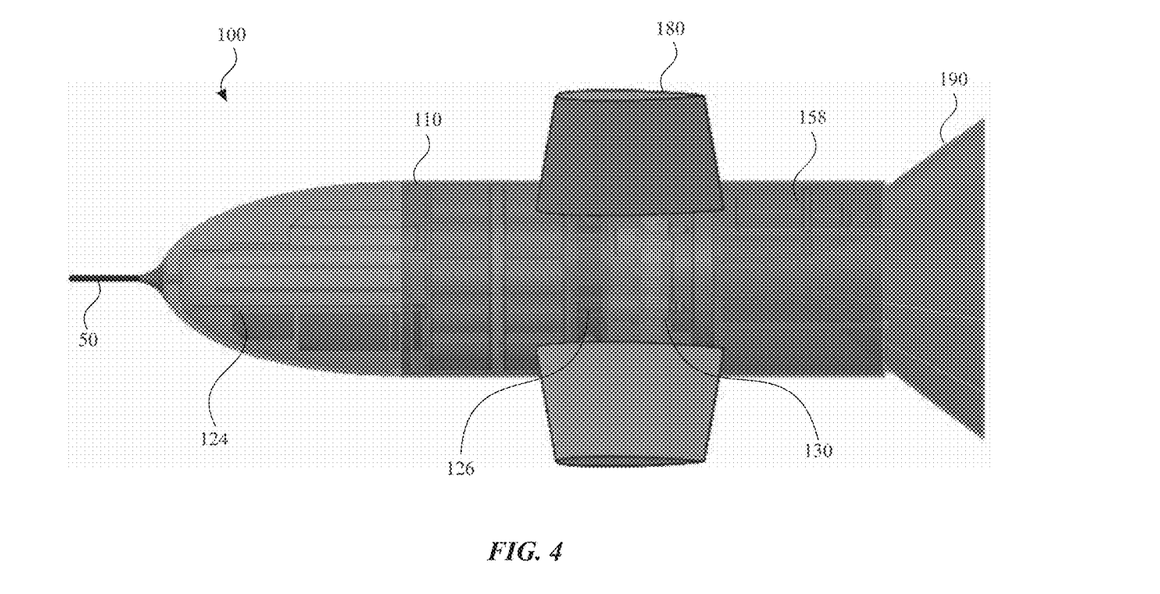
FIG. 4 illustrates a side view of the aircraft capture device of FIG. 3, according to some embodiments of the present disclosure.

According to some embodiments, an aircraft capture device can be used to interact with and capture a remote aircraft. FIGS. 3-7 illustrate an aircraft capture device 100, according to some embodiments of the present disclosure. According to some embodiments, for example as illustrated in FIGS. 3 and 4, the aircraft capture device 100 can include a nose portion 110 and a tail portion 190. At an end of the nose portion 110, the tether 50 can connect to the aircraft capture device 100. The aircraft capture device 100 can also include one or more fins 180 form a new ring the aircraft capture device 100. The fins 180 can independently or collectively move to adjust the lift, side force, and/or roll of the aircraft capture device 100. Control of the fins 180 can be manual and/or automated. For example, control can be provided by an onboard controller 124 and/or the transport controller 20. The onboard controller 124 can include actuation mechanisms, such as aileron servos, and a power source, such as batteries, to control operation of the fins 180. The onboard controller 124 can include communication equipment for communicating with the transport aircraft 10 (e.g., the transport controller 20) and/or the remote aircraft 90.

Figure 5:
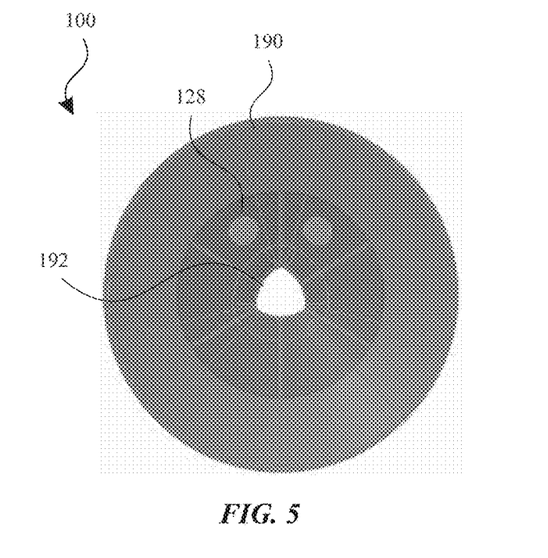
FIG. 5 illustrates a rear view of the aircraft capture device of FIG. 3, according to some embodiments of the present disclosure.
Figure 6:
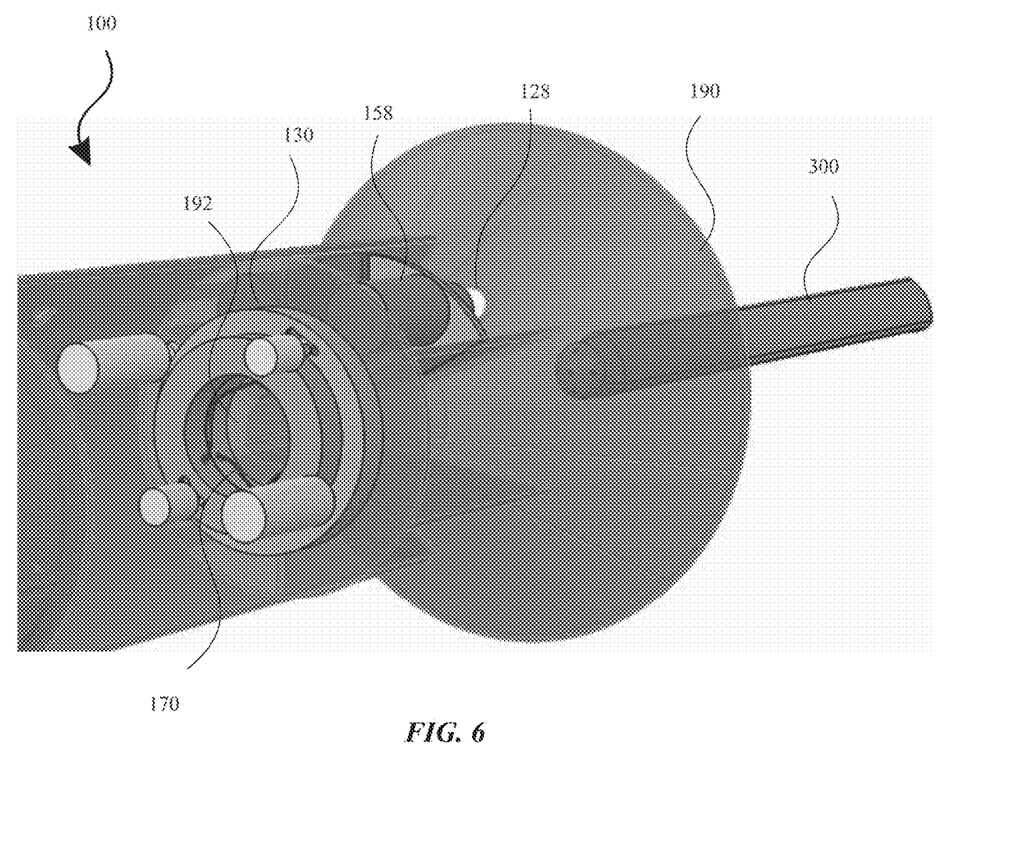
FIG. 6 illustrates a perspective internal view of the aircraft capture device of FIG. 3, according to some embodiments of the present disclosure.

According to some embodiments, for example as illustrated in FIG. 5, the tail portion 190 of the aircraft capture device 100 can define a receptacle 192 for receiving a probe 300 of the remote aircraft 90. The receptacle 192 can have a cross-sectional shape that is geometrically similar to or matching a cross-sectional shape of the probe 300. For example, the receptacle 192 and the probe 300 can each have a non-circular shape that has radial symmetry, but prevents the probe 300 from spinning freely within the receptacle 192. For example, the receptacle 192 and the probe 300 can each have a circular, polygonal, or Reuleaux triangle shape. According to some embodiments, for example as illustrated in FIGS. 5 and 6, the aircraft capture device 100 can include at least one camera 158 for visualizing the probe 300 upon approach toward the tail portion 190. The tail portion 190 can include one or more apertures 128 for providing a view to the cameras 158. The image produced by the camera can be processed by the onboard controller 124 and/or communicated to the transport aircraft 10 (e.g., the transport controller 20) and/or the remote aircraft 90.

Figure 7:
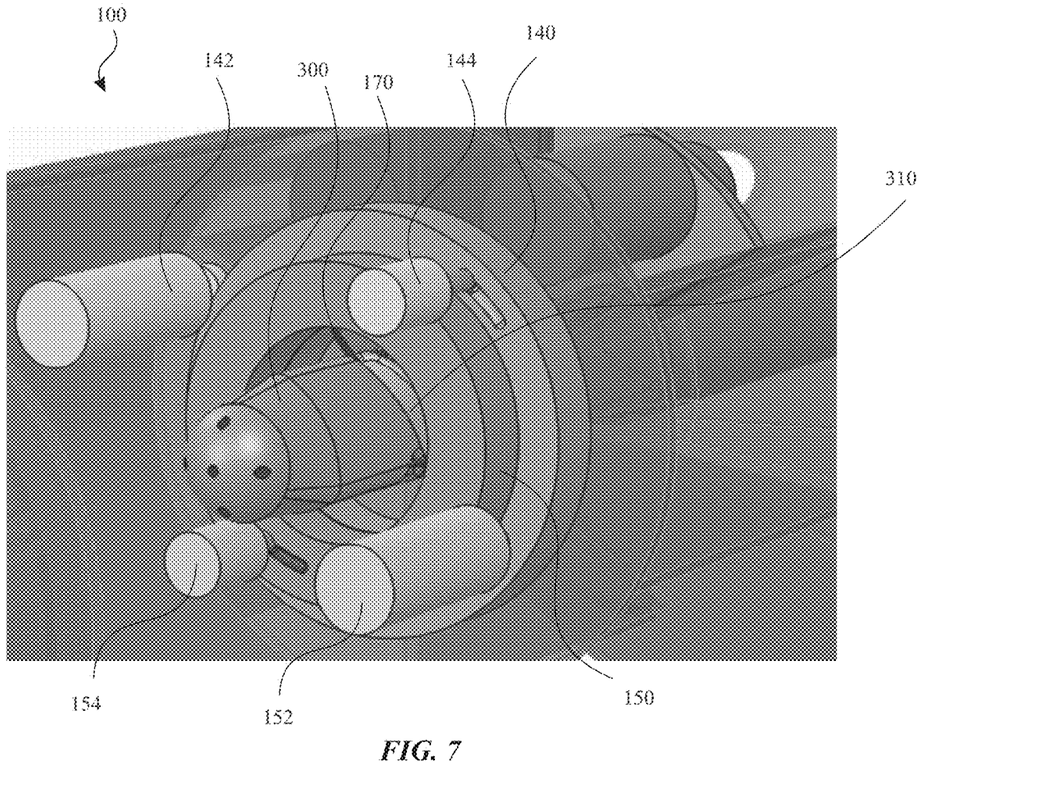
FIG. 7 illustrates a perspective internal view of the aircraft capture device of FIG. 3, according to some embodiments of the present disclosure.

According to some embodiments, for example as illustrated in FIGS. 6 and 7, the aircraft capture device 100 can include an actuation mechanism for engaging the probe 300 when the probe 300 is within the receptacle 192. The aircraft capture device 100 can include a first ring 140 connected to a first drive 142 for effecting rotation of the first ring 140. The aircraft capture device 100 can also include a first solenoid 144 for locking the first ring 140 when not the first solenoid 144 is not activated. The aircraft capture device 100 can also include a second ring 150 connected to a second drive 152 for effecting rotation of the second ring 150. The aircraft capture device 100 can also include a second solenoid 154 for locking the second ring 150 when the second solenoid 154 is not activated. The first solenoid 144 and the second solenoid 154 can be configured to lock the first ring 140 and the second ring 150, respectively, when not activated. For example, the first solenoid 144 and the second solenoid 154 can be spring loaded to rest within a detent of the first ring 140 and the second ring 150, respectively. The first solenoid 144 and the second solenoid 154 can be activated to overcome spring forces and release from the corresponding detent. The first ring 140 and the second ring 150 can be rotated in opposite directions. For example, the first ring 140 and the second ring 150 can be rotated in opposite directions about the same axis extending through the receptacle 192. Locking cables 170 can each be connected to both the first ring 140 and the second ring 150. At least a portion of each of the locking cables 170 can extend within a receptacle 192, such as between the first ring 140 and the second ring 150.

The aircraft capture device 100 can include, within the receptacle 192, an activation switch (not shown) for detecting contact with the probe 300 while the probe 300 is located in the receptacle 192. The activation switch can include, for example, a transducer that senses a force applied by the probe 300 and transmits an indication of the contact. For example, the indication can be transmitted to the onboard controller 124.

A probe of a remote aircraft can be secured by an aircraft capture device, according to embodiments described herein. In use, the aircraft capture device 100 can be maneuvered, as described herein, with respect to the remote aircraft 90. The aircraft capture device 100 can be placed in close proximity to the remote aircraft 90 by maneuvering the transport aircraft 10, the aircraft capture device 100 (e.g., with the tether 50) and/or the remote aircraft 90 relative to each other. The maneuvering operations can be performed manually and/or automatically. For example, absolute and/or relative position and/or velocity information can be communicated between or among the transport aircraft 10, the aircraft capture device 100 (e.g., with the tether 50) and/or the remote aircraft 90. Eventually, the probe 300 can be received within the receptacle 192.

Figure 8:
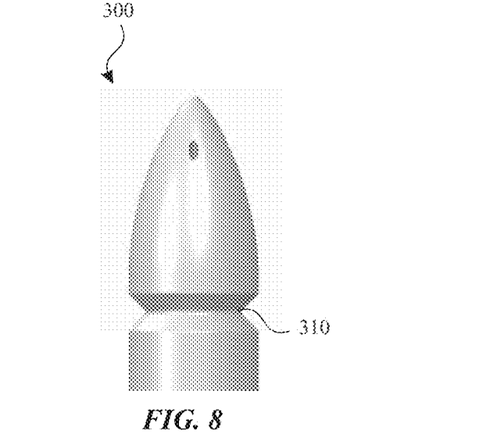
FIG. 8 illustrates a side view of a probe, according to some embodiments of the present disclosure.

A locking procedure can be initiated upon receipt of the probe 300, or a portion thereof, within the receptacle 192. For example, the activation switch can detect the presence of the probe 300 within the receptacle 192. Based on the indication or another signal, the locking cables 170 can be moved into positions within a groove 310 of the probe 300, as shown in FIG. 8, by rotating the first ring 140 relative to the second ring 150, as shown in FIG. 8. Prior to rotating, the first solenoid 144 can be activated to unlock the first ring 140 and the second solenoid 154 can be activated to unlock the second ring 150. The first drive 142 and the second drive 152 can be operated to perform the rotation of the first ring 140 and the second ring 150, respectively. Because the locking cables 170 are connected to the first ring 140 and the second ring 150, the rotating can increase tension of the locking cables 170 by increasing the distance between the attachment locations of the locking cables 170 to the first ring 140 and the second ring 150. For example, the attachment locations can move from a same radial side of the receptacle 192 to different radial sides (e.g., radially opposite sides) across the receptacle 192. The locking cables 170 can be moved such that they surround the probe 300 (e.g., the groove 310) on multiple sides thereof.

The locked configuration provided by the locking cables can be maintained with minimal additional energy. When the locking cables 170 are engaged about the probe 300, the locking cables 170 can be secured or locked into their locked configuration by deactivating the first solenoid 144 to lock the first ring 140 and deactivating the second solenoid 154 to lock the second ring 150. The tension of the locking cables 170 within the groove 310 resists axial movement of the probe 300. However, if forces applied by the probe 300 against the locking cables 170 exceed a threshold, the probe 300 may be allowed to escape the grip of the locking cables 170 to avoid damage.

After securing the probe 300 within the receptacle 192, the tether 50 can be used to reel the aircraft capture device 100 and the remote aircraft 90 to the transport aircraft 10. Once stabilized within the transport aircraft 10, the aircraft capture device 100 can be released (e.g., manually) from the remote aircraft 90. The aircraft capture device 100 can then be used to capture and/or deploy additional remote aircrafts.

According to some embodiments, the aircraft capture device 100 can be used to deploy a remote aircraft 90, for example by securing the probe 300 within the aircraft capture device 100 while on board the transport aircraft 10. The tether 50 can then be used to gradually extend the aircraft capture device 100 and the remote aircraft 90 away from the transport aircraft 10. Once the remote aircraft 90 has reached a desired distance from the transport aircraft 10 and velocity, the aircraft capture device 100 can release the remote aircraft 90 for autonomous flight.

Figure 9:
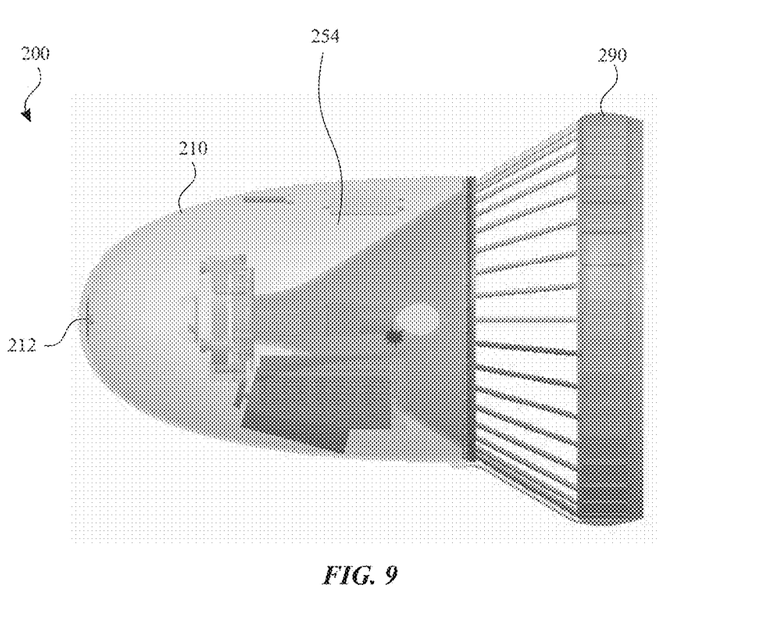
FIG. 9 illustrates a side view of an aircraft capture device, according to some embodiments of the present disclosure.
Figure 10:
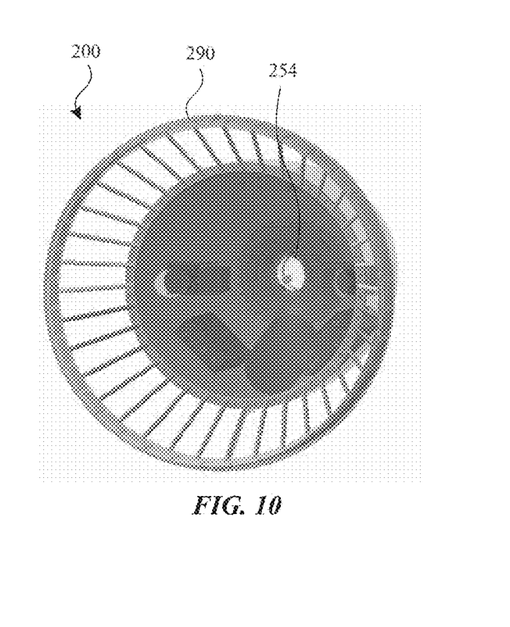
FIG. 10 illustrates a rear perspective view of the aircraft capture device of FIG. 9, according to some embodiments of the present disclosure.
Figure 11:
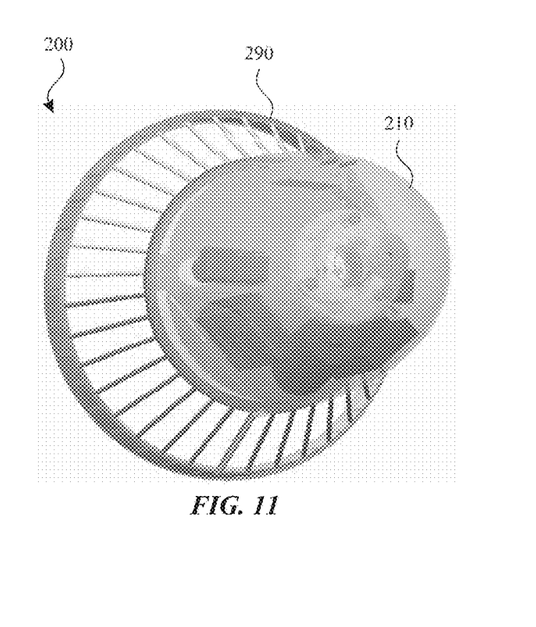
FIG. 11 illustrates a front perspective view of the aircraft capture device of FIG. 9, according to some embodiments of the present disclosure.

According to some embodiments, an aircraft capture device can be used to interact with and capture a remote aircraft. FIGS. 9-16 illustrate an aircraft capture device 200, according to some embodiments of the present disclosure. According to some embodiments, for example as illustrated in FIGS. 9-11, the aircraft capture device 200 can include a nose portion 210 and a tail portion 290. At an end of the nose portion 210, the tether can connect to the aircraft capture device 200 at an anchor 212. According to some embodiments, for example as illustrated in FIG. 10, the tail portion 290 of the aircraft capture device 200 can define a receptacle 254 for receiving a probe 300 of the remote aircraft 90. The receptacle 254 can have a cross-sectional shape that is geometrically similar to or matching a cross-sectional shape of the probe 300. According to some embodiments, for example as illustrated in FIGS. 8 and 10, the receptacle 254 and the probe 300 can include a circular cross-sectional shape. Other shapes are contemplated, as discussed herein.

Figure 12:
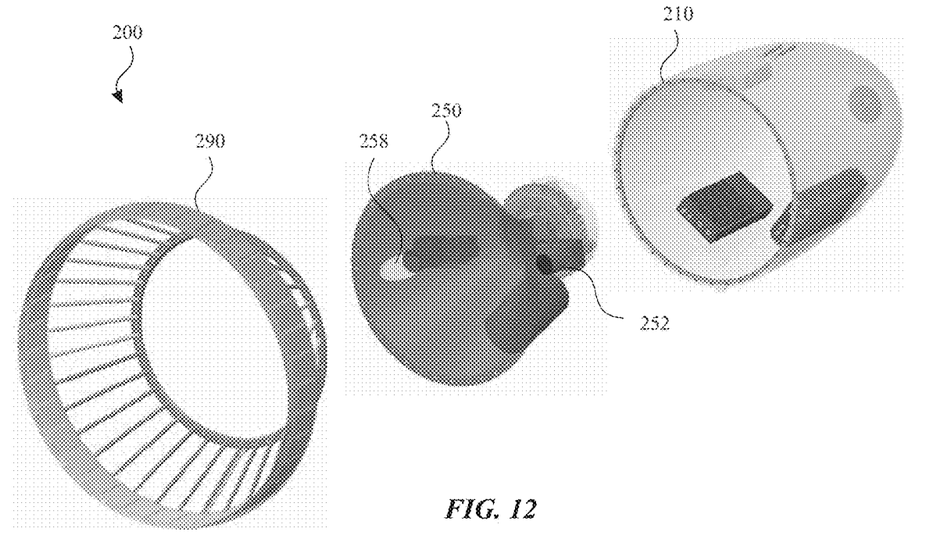
FIG. 12 illustrates a perspective exploded view of the aircraft capture device of FIG. 9, according to some embodiments of the present disclosure.
Figure 13:
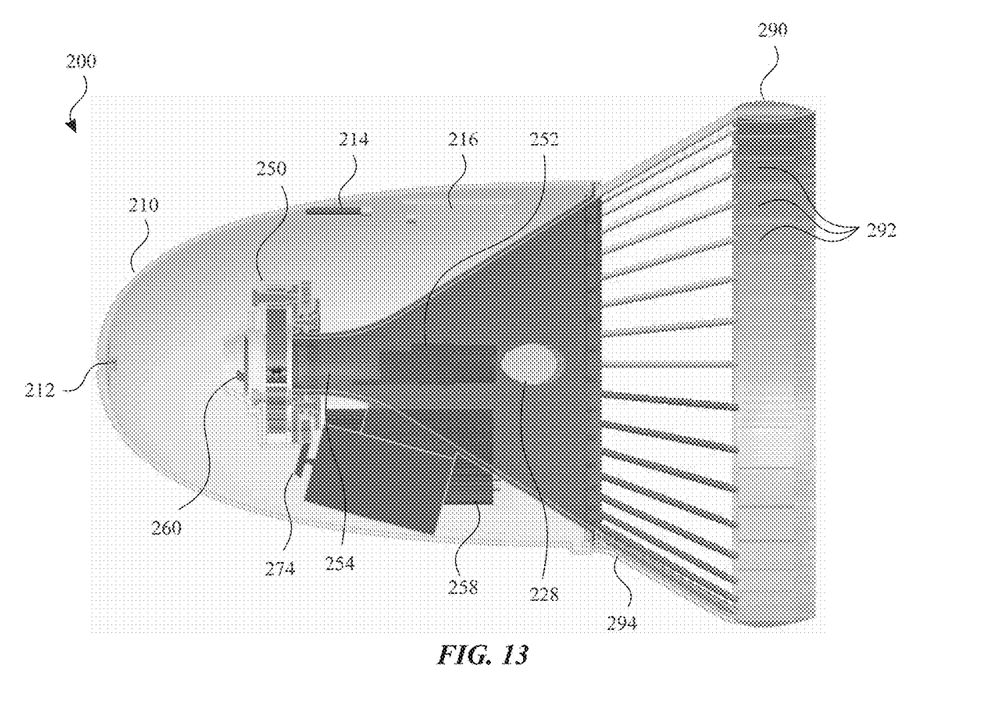
FIG. 13 illustrates a side sectional view of the aircraft capture device of FIG. 9, according to some embodiments of the present disclosure.

According to some embodiments, for example as illustrated in FIGS. 12 and 13, the aircraft capture device 200 can include at least one camera 252 for visualizing the probe 300 upon approach toward the tail portion 290. The tail portion 290 can include one or more apertures 228 for providing a view to the cameras 252. The image produced by the camera can be processed by an onboard controller 258 and/or communicated to the transport aircraft 10 (e.g., the transport controller 20) and/or the remote aircraft 90. The onboard controller 258 can include communication equipment, such as an antenna 214 and/or a receiver 216, for communicating with the transport aircraft 10 (e.g., the transport controller 20) and/or the remote aircraft 90.

According to some embodiments, the tail portion 290 can include one or more batteries 292 that are distributed about a periphery of the tail portion 290. The batteries 292 can be positioned to be rearward of a center of gravity of the aircraft capture device 200. The batteries 292 can be positioned to be evenly distributed (e.g., by weight) circumferentially. A power conduit 294 can connect the batteries 292 to the onboard controller 258 within the nose portion 210.

Figure 14:
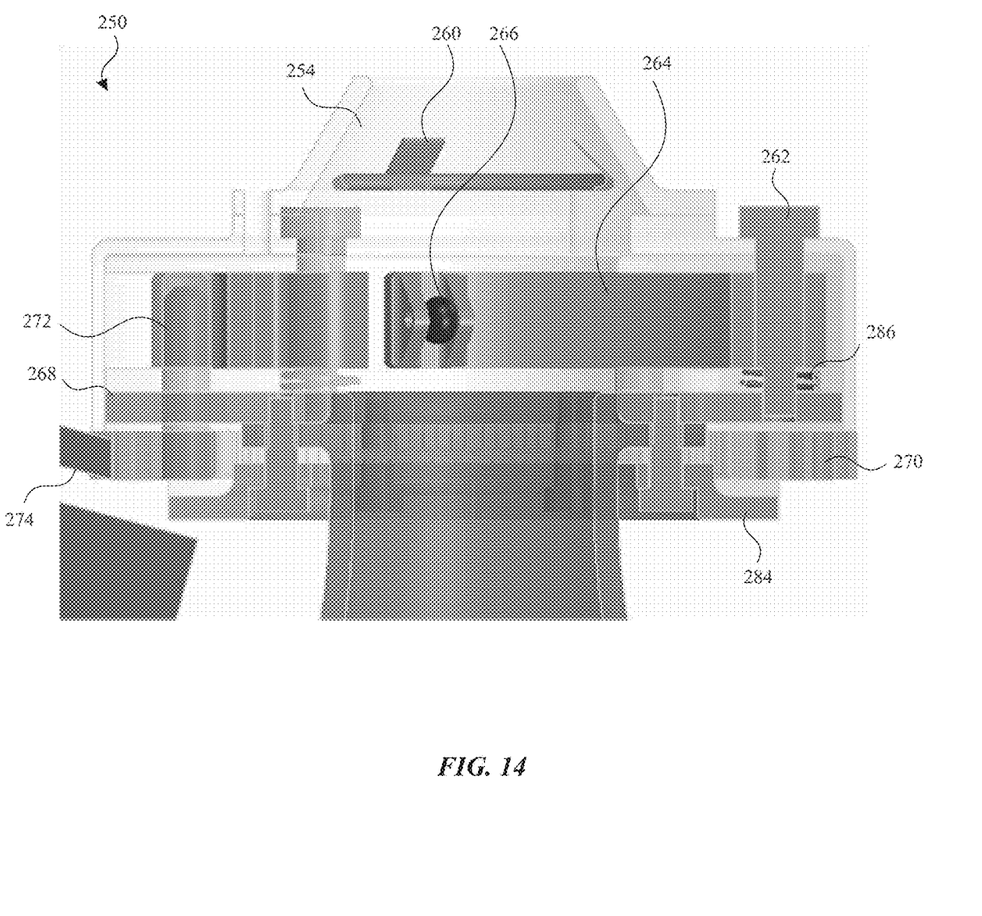
FIG. 14 illustrates a sectional view of an actuation mechanism, according to some embodiments of the present disclosure.
Figure 15:
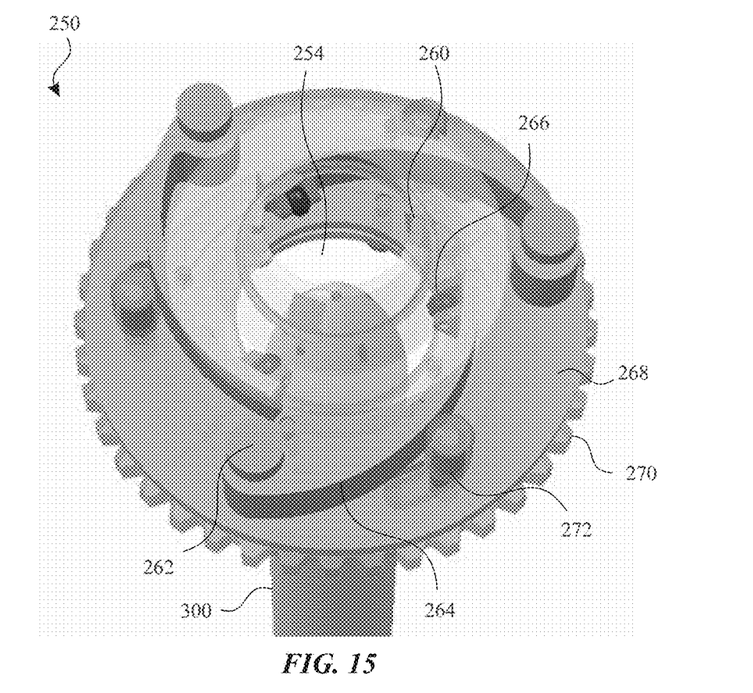
FIGS. 15 and 16 illustrate perspective views of the actuation mechanism of FIG. 14, according to some embodiments of the present disclosure.

According to some embodiments, for example as illustrated in FIGS. 13-15, the aircraft capture device 200 can include, within the receptacle 254, an activation switch 260 for detecting contact with the probe 300 while the probe 300 is located in the receptacle 254. The activation switch 260 can include, for example, a transducer that senses a force applied by the probe 300 and transmits an indication of the contact. For example, the indication can be transmitted to the onboard controller 258.

According to some embodiments, for example as illustrated in FIGS. 14 and 15, the aircraft capture device 200 can include an actuation mechanism 250 for engaging the probe 300 when the probe 300 is within the receptacle 254. The actuation mechanism 250 of the aircraft capture device 200 can include locking arms 264 that surround and engage an outer surface of the probe 300. For example, the actuation mechanism 250 can include at least three locking arms 264. Each of the locking arms 264 can be rotatable about a corresponding pivot 262, defining an axis of rotation, near one end of the locking arm 264. At an opposite end of the locking arm 264, an engagement end 266 moves as the locking arm transitions between an unlocked configuration and a locked configuration. In the locked configuration, the locking arm 264 can be positioned within the receptacle 254. The locking arms 264 can be spring-loaded (e.g., with a spring 286) to be biased to the unlocked configuration when not acted upon by an external force.

The locking arms 264 can be rotated by the action of rollers 272 attached to a plate 270. For example, each of the rollers 272 can be connected to the plate 270. For example, each of the rollers 272 can be attached to the plate 270 and rotate freely relative to the plate and about an axis that extends through the plate 270. The rotation of the rollers 272 relative to the plate 270 allow the rollers 272 to apply a force along a length of the locking arms 264 without scraping an outer surface at the region of contact with the locking arms 264. The rollers 272 can extend through a housing 268 that limits the range of motion that the rollers 272 can achieve with movement of the plate 270. Each of the rollers 272 can be placed in contact with a corresponding locking arm 264 as the plate rotates. The plate 270 can be rotated by a motor 274 connected to the plate 270, for example as interconnected gears. As the plate 270 rotates (e.g., about an axis of the receptacle 254 and/or the probe 300), the rollers 272 move against the locking arms 264 to transition the locking arms 264, as levers, between the unlocked configuration and the locked configuration.

According to some embodiments, the geometrical relation of the pivots 262, the rollers 272, and the locking arms 264, along with the material, shape, and thickness of locking arms 264 coupled with the travel of the rollers 272 on the locking arms 264 can contribute to the clamping force exerted by the engagement ends 266 on the groove 310 of probe 300. Adjustment of these parameters can facilitate control of a maximum clamping force.

Each of the locking arms can include, at the engagement end 266, a rotatable wheel that facilitates reception of the probe 300. For example, each of the rotatable wheels can rotate about an axis that is orthogonal to a central axis of the receptacle 254 and/or the probe 300. As the probe 302 is the receptacle 254, it may come into contact with the engagement ends 266 as the locking arms 264 are positioned within the receptacle 254. The rotatable wheels of the engagement ends 266 allow the probe 300 to travel without substantial friction with the engagement ends 266.

According to some embodiments, the actuation mechanism 250 comprises a brake for maintaining the locking arms 264 in the locked configuration. For example, the brake can arrest or prevent movement of the motor 274 and/or the plate 270 when activated. The brake can be a component of the motor 274. Alternatively or in combination, the brake can act on the plate 270. For example, a clamp ring 284 can apply a force to the plate 270 when applied.

A probe of a remote aircraft can be secured by an aircraft capture device, according to embodiments described herein. In use, the aircraft capture device 200 can be maneuvered, as described herein, with respect to the remote aircraft 90. The aircraft capture device 200 can be placed in close proximity to the remote aircraft 90 by maneuvering the transport aircraft 10, the aircraft capture device 200 (e.g., with the tether 50) and/or the remote aircraft 90 relative to each other. The maneuvering operations can be performed manually and/or automatically. For example, absolute and/or relative position and/or velocity information can be communicated between or among the transport aircraft 10, the aircraft capture device 200 (e.g., with the tether 50) and/or the remote aircraft 90. Eventually, the probe 300 can be received within the receptacle 254.

Figure 16:
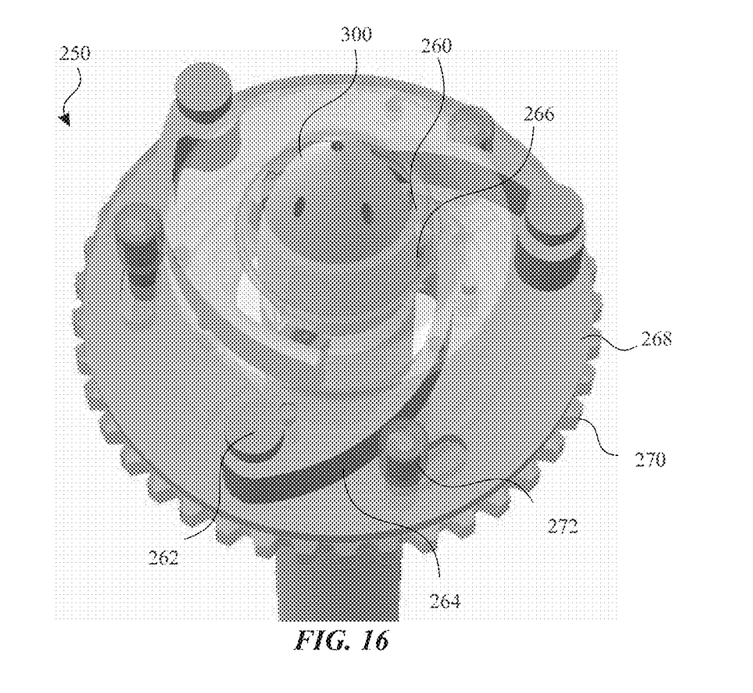

A locking procedure can be initiated upon receipt of the probe 300, or a portion thereof, within the receptacle 254. For example, the activation switch 260 can detect the presence of the probe 300 within the receptacle 254. Based on the indication or another signal, the engagement ends 266 of the locking arms 264 can be moved into positions within a groove 310 of the probe 300, as shown in FIG. 16, by rotating the plate 270 and the rollers 272 about the probe 300. For example, each of the rollers 272 can move towards a corresponding pivot 262 to urge a corresponding locking arm 264 into the receptacle 254 and against the probe 300. Each of the rollers 272 applies a force to a corresponding locking arm 264 to rotate the corresponding locking arm 264 about a corresponding axis. Prior to rotating, the brake can release the plate 270 and/or the motor 274. The motor 274 can be operated to perform the rotation of the plate 270. The engagement ends 266 of the locking arms 264 can be moved such that they surround the probe 300 (e.g., the groove 310) on multiple sides thereof.

The locked configuration provided by the locking arms can be maintained with minimal additional energy. When the locking arms 264 are engaged about the probe 300, the plate 270 and/or the motor 274 can be secured or locked into the locked configuration by setting the brake (e.g., a brake of the motor 274). The secure positioning of the locking arms 264 within the groove 310 resists axial movement of the probe 300. However, if forces applied by the probe 300 against the locking arms 264 exceed a threshold, the probe 300 may be allowed to escape the grip of the locking arms 264 to avoid damage.

After securing the probe 300 within the receptacle 254, the tether 50 can be used to reel the aircraft capture device 200 and the remote aircraft 90 to the transport aircraft 10. Once stabilized within the transport aircraft 10, the aircraft capture device 200 can be released (e.g., manually) from the remote aircraft 90. The aircraft capture device 200 can then be used to capture and/or deploy additional remote aircrafts.

According to some embodiments, the aircraft capture device 200 can be used to deploy a remote aircraft 90, for example by securing the probe 300 within the aircraft capture device 200 while on board the transport aircraft 10. The tether 50 can then be used to gradually extend the aircraft capture device 200 and the remote aircraft 90 away from the transport aircraft 10. Once the remote aircraft 90 has reached a desired distance from the transport aircraft 10 and velocity, the aircraft capture device 200 can release the remote aircraft 90 for autonomous flight.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An aircraft capture device comprising:
a receptacle;
one or more locking arms wherein each of the one or more locking arms is rotatable about a corresponding axis from an unlocked configuration to a locked configuration within the receptacle; and
an actuation mechanism comprising rollers attached to a plate, wherein each of the rollers is in contact with a corresponding locking arm, wherein rotation of the plate transitions the one or more locking arms between the unlocked configuration and the locked configuration, wherein the one or more locking arms and the plate are rotatable about continuously parallel axes.

2. The aircraft capture device of claim 1, wherein an engagement end of each locking arm comprises a rotatable wheel.

3. The aircraft capture device of claim 1, wherein the actuation mechanism comprises a brake for maintaining the one or more locking arms in the locked configuration.

4. The aircraft capture device of claim 1, further comprising, within the receptacle, an activation switch for detecting contact with a probe located in the receptacle and for transmitting an indication of the contact.

5. The aircraft capture device of claim 4, further comprising a controller configured to operate a motor to rotate the plate upon receipt of the indication from the activation switch.

6. The aircraft capture device of claim 5, further comprising a nose portion and a tail portion, the motor residing within the nose portion, the tail portion comprising one or more batteries connected to the motor.

* * * * *